(12) United States Patent
Graham et al.

(10) Patent No.: US 6,873,085 B2
(45) Date of Patent: Mar. 29, 2005

(54) BRUSHLESS MOTOR

(75) Inventors: Gregory S. Graham, Ventura, CA (US); Gerald W. Yankie, Santa Barbara, CA (US)

(73) Assignee: G & G Technology, Inc., Ventura, CA (US)

( * ) Notice: Subject to any disclaimer, the term of this patent is extended or adjusted under 35 U.S.C. 154(b) by 0 days.

(21) Appl. No.: 10/125,809

(22) Filed: Apr. 18, 2002

(65) Prior Publication Data

US 2002/0171306 A1 Nov. 21, 2002

Related U.S. Application Data

(60) Provisional application No. 60/354,792, filed on Feb. 6, 2002, and provisional application No. 60/291,704, filed on May 16, 2001.

(51) Int. Cl.[7] .......................... H02K 15/12; H02K 3/47; H02K 21/12; H02K 1/27
(52) U.S. Cl. ............. 310/266; 310/156.08; 310/156.34; 310/195; 310/208
(58) Field of Search ........................... 310/156.34, 156, 310/266, 268, 195, 45, 264, 261, 208, 42, 156.12

(56) References Cited

U.S. PATENT DOCUMENTS

| | | |
|---|---|---|
| 1,631,186 A | 6/1927 | Apple |
| 1,738,166 A | 12/1929 | Apple ........................ 29/598 |
| 1,789,129 A | 1/1931 | Apple |
| 1,917,482 A | 7/1933 | Apple ........................ 310/201 |
| 2,780,742 A | 2/1957 | Jenner et al. ............... 310/179 |
| 3,154,695 A | 10/1964 | MacGregor er al. ........ 315/139 |
| 3,209,187 A * | 9/1965 | Wilhelm ..................... 310/266 |
| 3,312,846 A | 4/1967 | Henry-Baudot |
| 3,324,323 A * | 6/1967 | Baudot ....................... 310/266 |
| 3,441,761 A | 4/1969 | Painton |
| 3,488,837 A | 1/1970 | Massouda et al. ............ 29/598 |
| 3,532,916 A | 10/1970 | Fisher |
| 3,551,715 A | 12/1970 | Silverton et al. |
| 3,562,569 A | 2/1971 | Koechlin ..................... 310/214 |
| 3,609,431 A | 9/1971 | Lifshtiz |
| 3,623,220 A | 11/1971 | Chase |
| 3,638,094 A | 1/1972 | Ve Nard II .................. 363/43 |
| 3,650,021 A | 3/1972 | Karol |
| 3,671,846 A | 6/1972 | Corey ......................... 363/43 |
| 3,678,367 A | 7/1972 | McMurray ................... 363/10 |
| 3,694,907 A | 10/1972 | Margrain et al. ............. 29/598 |
| 3,698,079 A | 10/1972 | Lifschitz |
| 3,726,004 A | 4/1973 | Holland et al. |
| 3,763,551 A | 10/1973 | Herron |
| 3,769,569 A | 10/1973 | Doemen ..................... 318/805 |
| 3,792,286 A | 2/1974 | Meier .......................... 307/58 |

(List continued on next page.)

FOREIGN PATENT DOCUMENTS

| | | | | |
|---|---|---|---|---|
| DE | 3607289 A1 * | 9/1986 | .......... | H02K/23/56 |
| JP | 05318678 A | 12/1993 | | |
| JP | 05328678 | 12/1993 | .......... | H02K/15/04 |
| JP | 06133520 A * | 5/1994 | .......... | H02K/29/00 |

OTHER PUBLICATIONS

International Search Report dated Aug. 2, 2000 from PCT International Application No. PCT/US00/08374.
International Preliminary Examination Report dated Jun. 19, 2001 from PCT International Application No. PCT/US00/08374.

*Primary Examiner*—Karl Tamai
*Assistant Examiner*—J. Aguirrechea
(74) *Attorney, Agent, or Firm*—McDermott Will & Emery LLP

(57) ABSTRACT

A brushless motor with a rotor having a magnet and a magnetic return, the magnet and magnetic return being arranged to form a gap therebetween, and a stator having a coil disposed in the gap.

15 Claims, 4 Drawing Sheets

U.S. PATENT DOCUMENTS

| | | | |
|---|---|---|---|
| 3,805,104 A | | 4/1974 | Margrain et al. |
| 3,816,907 A | | 6/1974 | Small |
| 3,845,339 A | * | 10/1974 | Merkle et al. .......... 310/156.34 |
| 3,879,650 A | | 4/1975 | Lachocki ....................... 321/5 |
| 3,944,857 A | | 3/1976 | Faulhaber |
| 4,019,075 A | | 4/1977 | Kagami |
| 4,070,605 A | | 1/1978 | Hoeppner ................... 318/227 |
| 4,110,901 A | * | 9/1978 | Nakamura et al. ............. 29/598 |
| 4,123,679 A | | 10/1978 | Miyasaka |
| 4,129,938 A | | 12/1978 | Hagenbucher ............... 29/608 |
| 4,187,453 A | | 2/1980 | Rough |
| 4,225,914 A | | 9/1980 | Hirata et al. ................. 363/160 |
| 4,268,810 A | | 5/1981 | Iwasa et al. ................. 336/205 |
| 4,271,370 A | | 6/1981 | DiMeo |
| 4,321,494 A | | 3/1982 | MacNab ..................... 310/179 |
| 4,599,686 A | | 7/1986 | Muller et al. ................. 363/41 |
| 4,645,961 A | * | 2/1987 | Malsky .................. 310/156.07 |
| 4,808,873 A | | 2/1989 | Rowe et al. ................. 310/260 |
| 5,004,944 A | * | 4/1991 | Fisher ....................... 310/266 |
| 5,041,768 A | | 8/1991 | Herrmann ................... 318/138 |
| 5,130,596 A | | 7/1992 | Umeki ....................... 310/234 |
| 5,132,892 A | | 7/1992 | Mizoguchi ................... 363/42 |
| 5,270,602 A | | 12/1993 | Takehara |
| 5,294,875 A | | 3/1994 | Reddy ....................... 318/801 |
| 5,331,244 A | * | 7/1994 | Rabe ......................... 310/180 |
| 5,650,708 A | | 7/1997 | Sawada et al. ............. 318/801 |
| 5,714,828 A | * | 2/1998 | Ackermann et al. ........ 310/254 |
| 5,793,138 A | | 8/1998 | Kliman et al. |
| 5,798,623 A | | 8/1998 | El-Sadi ....................... 312/254 |
| 6,026,558 A | | 2/2000 | Yoshida et al. ................ 29/598 |
| 6,111,329 A | * | 8/2000 | Graham et al. ................ 310/42 |
| 6,175,178 B1 | | 1/2001 | Tupper et al. |
| 6,184,640 B1 | | 2/2001 | Kawashima |
| 6,198,184 B1 | | 3/2001 | Ohi et al. |
| 6,204,618 B1 | | 3/2001 | Wang et al. |
| 6,218,760 B1 | | 4/2001 | Sakuragi et al. |
| 6,236,126 B1 | | 5/2001 | Yagi et al. |
| 6,236,133 B1 | | 5/2001 | Nishikawa et al. |
| 6,239,567 B1 | | 5/2001 | Sunaga et al. |
| 6,304,045 B1 | | 10/2001 | Muszynski ................... 318/349 |
| 6,348,775 B1 | | 2/2002 | Edelson et al. ............. 318/727 |
| 6,351,052 B1 | * | 2/2002 | Kim ........................... 310/179 |
| 6,459,221 B1 | | 10/2002 | Dreher et al. ............... 318/254 |
| 6,568,065 B2 | * | 5/2003 | Graham et al. ................ 29/596 |
| 6,570,361 B1 | | 5/2003 | Edelson ..................... 318/138 |
| 2001/0015904 A1 | | 8/2001 | Kimura ....................... 363/131 |
| 2001/0030519 A1 | | 10/2001 | Baum ......................... 318/254 |
| 2003/0053323 A1 | | 3/2003 | Kimura et al. ................. 363/98 |

* cited by examiner

BRUSHLESS MOTOR

CROSS-REFERENCE TO RELATED APPLICATION

The present application claims priority under 35 U.S.C. § 119(e) to provisional Application No. 60/291,704, filed May 16, 2001 and provisional Application No. 60/354,792, filed Feb. 6, 2002, the content of which is expressly incorporated herein by reference as though filly set forth in full.

BACKGROUND

1. Field

The present invention relates to electrical machines, and more particularly, to brushless electric motors.

2. Background

Generally a brushless motor includes a rotor having a shaft with a permanent magnet affixed thereto. The brushless motor may also include a stator having a hollow cylinder with ball bearing mounted on an interior portion of the cylinder to rotatably support the rotor shaft. The stator may also include induction coil windings mounted on the case of the motor or interleaved with laminated iron rings. Current may be applied to the stator windings to cause the magnet to rotate and thereby deliver rotary power to the rotor shaft.

Although brushless motors generally can be made to spin faster and handle higher currents than brush motors, they have disadvantages associated with variations in the magnetic flux field at the magnets and the laminations that comprise the magnetic return path, which may cause cogging and concomitant vibration in the motor and associated structures as well as energy losses in the laminations due to induced eddy currents. Slotless brushless DC motors may exhibit reduced cogging but may require that the wires comprising the stator be supported by a fixed laminate structure thus having reduced energy conversion efficiency due to induced eddy current losses. Energy losses due to heating of the laminate structures found in brushless motors may negatively impact the efficiency of the motor and total power output. There is therefore a need in the art for improvements in brushless motor design.

SUMMARY

In one aspect of the present invention, a brushless motor includes a rotor having a mounting surface, a magnet disposed on the mounting surface, and a magnetic return without a magnet, the mounting surface and the magnetic return being concentric and arranged to form a gap between the magnet and the magnetic return, and a stator having an ironless coil disposed in the gap, the coil comprising concentric inner and outer winding portions separated by at least one continuous fiber strand wrapped a plurality of times around the inner winding portion, each of the winding portions comprising a plurality of conductive bands with each of the conductive bands of one of the winding portions being coupled to one of the conductive bands of the other winding portion, the winding portions being impregnated with an encapsulation material.

In another aspect of the present invention, a brushless motor includes a rotor having a mounting surface, a magnet disposed on the mounting surface, and a magnetic return surrounding the magnet to form a gap therebetween, the magnetic return being configured without a magnet, and wherein the mounting surface and the magnetic return are concentric, and a stator having an ironless coil disposed in the gap, the coil comprising concentric inner and outer winding portions separated by at least one continuous fiber strand wrapped a plurality of times around the inner winding portion, each of the winding portions comprising a plurality of conductive bands with each of the conductive bands of one of the winding portions being coupled to one of the conductive bands of the other winding portion, the winding portions being impregnated with an encapsulation material.

It is understood that other aspects of the present invention will become readily apparent to those skilled in the art from the following detailed description, wherein is shown and described only exemplary embodiments of the invention, simply by way of illustration. As will be realized, the invention is capable of other and different embodiments, and its several details are capable of modifications in various respects, all without departing from the invention. Accordingly, the drawings and description are to be regarded as illustrative in nature, and not as restrictive.

BRIEF DESCRIPTION OF THE DRAWINGS

Aspects of the present invention are illustrated by way of example, and not by way of limitation, in the accompanying drawings in which like reference numerals refer to similar elements wherein.

DETAILED DESCRIPTION

The detailed description set forth below in connection with the appended drawings is intended as a description of exemplary embodiments of the present invention and is not intended to represent the only embodiments in which the present invention can be practiced. The term "exemplary" used throughout this description means "serving as an example, instance, or illustration," and should not necessarily be construed as preferred or advantageous over other embodiments. The detailed description includes specific details for the purpose of providing a thorough understanding of the present invention. However, it will be apparent to those skilled in the art that the present invention may be practiced without these specific details. In some instances, well known structures and devices are shown in block diagram form in order to avoid obscuring the concepts of the present invention.

In an exemplary brushless motor, a rotor includes a magnet which is positioned concentrically with a stator coil and may rotate either inside the stator coil or outside of the stator coil. In either case, an iron magnetic return path is part of the rotor and rotates with the magnet. The construction of the rotor and stator coil may take on various forms depending on the specific application and the overall design constraints. By way of example, the rotor may be implemented with a metal shaft coupled to a rotor cap. A mounting surface carrying the magnet may be coupled to the rotor cap and arranged concentrically with the shaft. The mounting surface can be an iron cylinder or any other similar structure known in the art. A magnetic return, which may also be an iron cylinder or similar structure, surrounds the mounting surface to create a magnetic air gap between the magnet and the magnetic return. The stator coil can be positioned in the magnetic air gap. A stator faceplate supporting the stator coil may be formed with a hollow cylinder for rotatably supporting the rotor shaft with ball bearings or bushings. The shaft, mounting support, and magnetic return rotate around and within the stator coil during operation. In at least one embodiment of the brushless motor, the magnetic return can be inserted over stator coil.

Figure 1A:
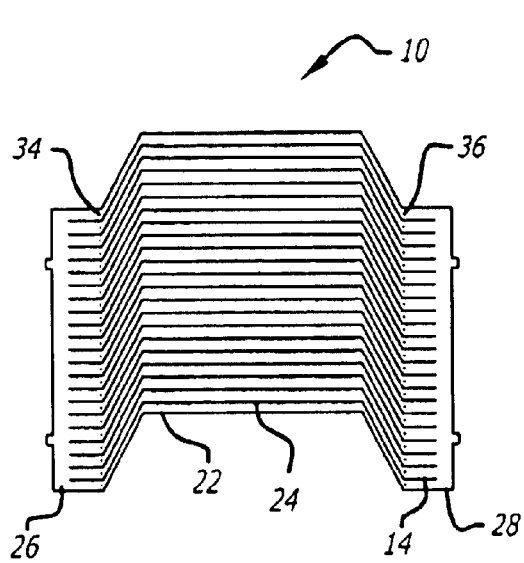
FIGS. 1A and 1B are graphical illustrations exhibiting a plan view of a pair of copper plates, precision cut for use in an exemplary brushless motor.
Figure 1B:
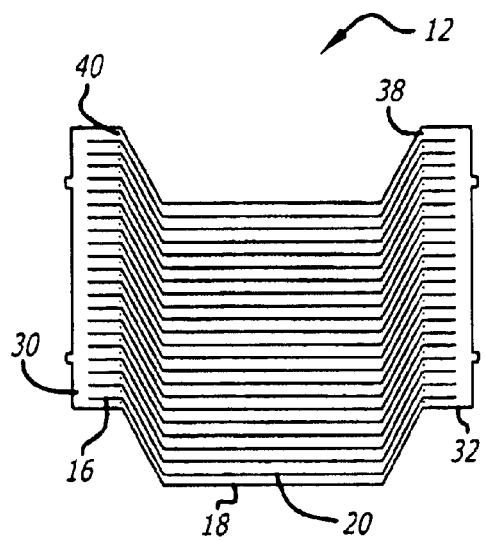

The stator coil can be constructed in a variety of ways. A free-standing stator coil is well suited for motor applications using a rotor with a magnetic return. A free-standing stator coil includes windings that are structurally self sufficient. The windings of the free-standing coil do not need to be wound on the case of the motor or interleaved with laminated iron rings. An exemplary free-standing coil is shown in FIGS. 1–5. Referring to FIGS. 1A and 1B, the exemplary free-standing coil can be constructed from a thin pair of nearly mirror image, electrically conductive and precision-machined pieces of bare sheet metal plates 10 and 12. The plates 10 and 12 may be made of tempered copper grade 110 with each plate precision cut in a pattern to produce a series of generally parallel conductive bands 18 and 22, with each band being separated from the other by an elongated cutout such as cutout 14 of the plate 10 and cutout 16 of the plate 12. The cutouts prevent electrical contact between neighboring bands such as bands 18 and 20 of the plate 12 and bands 22 and 24 of the plate 10. In the described exemplary embodiment, the width of a cutout is about 1–1.5 times the conductor thickness. A cutout width of about 1–1.5 times the conductor thickness reduces the electrical resistance over conventional approaches.

Each copper plate 10 and 12 is commonly 2 inch by 3 inch (approximately 5 cm times 7.5 cm) and has a thickness of about 0.005 inch (0.12 mm). Other dimensions and materials may be used to manufacture the conductive plates 10 and 12 depending on the particular application. The desired pattern can be achieved by precision cutting the plates by chemical machining. The desired pattern can be machined by alternate techniques such as water jet cutting, laser cutting, electron beam cutting, punching, progressive die or other conventional machining methods.

The copper plate 10 includes carrier strips 26 and 28 on each edge, and the copper plate 12 includes carrier strips 30 and 32 on each edge. The carrier strips support the conductive bands at each end and are subsequently removed as explained below. The pattern also includes a series of relatively small holes such as holes 34 and 36 of plate 10 and holes 38 and 40 of plate 12, one on each end of a conductive band. An exemplary diameter for each hole is about 0.25 mm. The total number of holes on each side is generally equal to the number of conductive bands. It will be appreciated that a stator comprising an induction coil of this type may be constructed from plates having less or more conductive bands and holes depending on the particular brushless motor operational requirements.

Figure 2:
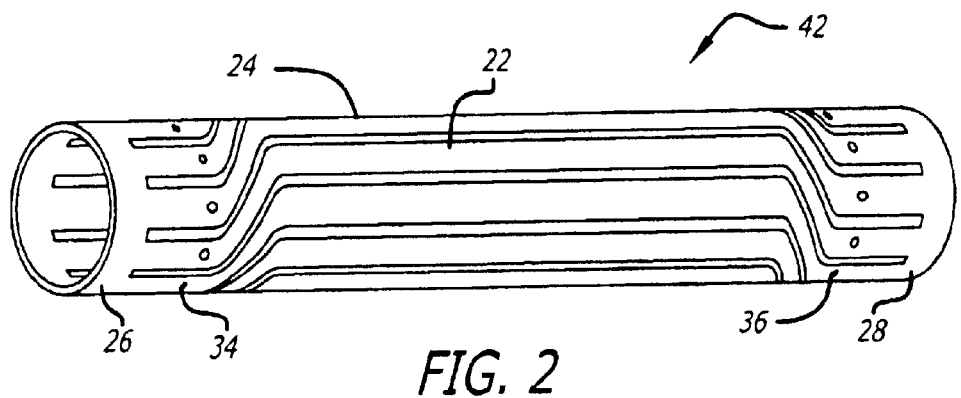
FIG. 2 is a graphical illustration of an elevation perspective view of the copper plate of FIG. 1A rolled into a hollow cylinder for use in an exemplary brushless motor.
Figure 3:
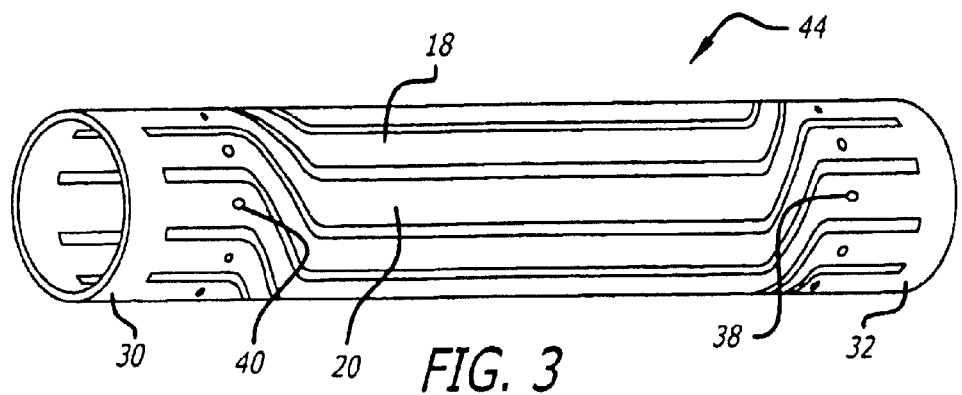
FIG. 3 is a graphical illustration of an elevation perspective view of the copper plate of FIG. 1B rolled into a hollow cylinder for use in an exemplary brushless motor.

Plate 10 is rolled into a thin-walled hollow cylindrical shape such as cylinder 42, of FIG. 2. Plate 12 is also rolled into a thin-walled hollow cylindrical shape such as cylinder 44, of FIG. 3, but with its pattern of conductive bands and cutouts specifically oriented to create a near mirror image of the pattern of conductive bands and cutouts of plate 10. An exemplary illustrative diameter of cylinder 42 is about 0.510 inch (apx 2 cm) and an exemplary illustrative diameter of cylinder 44 is about 0.520 inch (apx 2 cm). Cylinder 42 is formed with a slightly smaller diameter to allow subsequent axial alignment of the same into cylinder 44 to form a conductive induction coil. For this reason, cylinder 44 will hereafter be referred to as outer cylinder 44 and cylinder 42 will respectively be referred to as inner cylinder 42. Other size cylinder diameters may be utilized.

Figure 4:
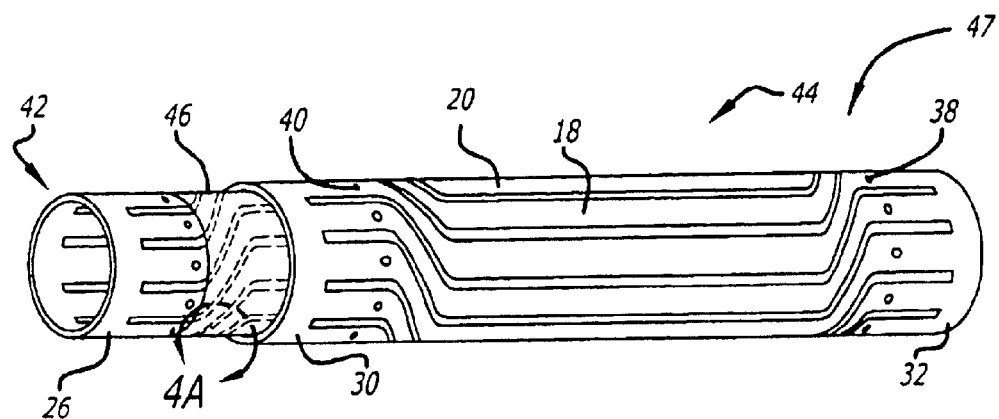
FIG. 4 is a graphical illustration of an elevation perspective view of the cylinder of FIG. 2 being inserted into the cylinder of FIG. 3 to form a cylindrical conductive coil for use in an exemplary brushless motor.
Figure 4A:
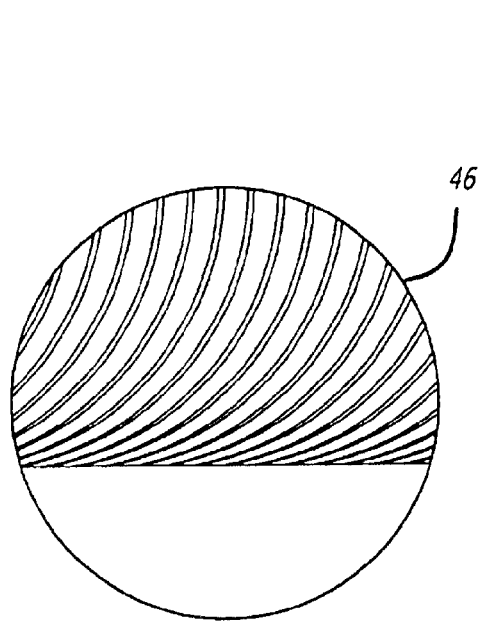
FIG. 4A is a graphical illustration of an enlargement a portion of FIG. 4 illustrating detail of a wound glass fiber layer.

Next, inner cylinder 42 is placed on a mandrel and four to five layers of fine industrial grade glass strands 46, shown in FIG. 4, commonly having a thickness of about 0.00015 inch, are tightly wrapped over the entire outer surface where insulation is required while at the same time avoiding the interconnect areas of inner cylinder 42. The tight wrapping of multiple layers of glass fiber strands over outer surface of inner cylinder 42 provides structural support for the tubular structure. The glass fiber layers also provide a certain degree of physical separation and concomitant electrical insulation between inner cylinder 42 and outer cylinder 44. An exemplary illustrative thickness of the glass fiber layers is about 0.00075 inch and is therefore relatively small but may add significant strength. The wrapped inner cylinder 42 is then inserted all the way into outer cylinder 44 so as to ensure concentric and axial alignment of both cylinders and matching of respective holes on each side of inner cylinder 42 with the corresponding holes on each side of outer cylinder 44 (FIG. 4). The next step is to tightly wrap layers of industrial grade glass fiber strands over the outer surface of outer cylinder 44 in the same way as was done with inner cylinder 42. This glass fiber layer provides for structural support. An exemplary illustrative thickness of the outer cylinder glass fiber layers is about 0.001 inch. The electrical insulation and stator coil structural strength required depends on the application of the brushless motor being produced.

The matched holes are utilized to provide solder flow paths to interconnect pads of each coil segment using for example a lead-silver-tin solder material which can withstand operational temperatures as high as 450 degrees Fahrenheit ("F"). This interconnect can be welded instead of soldered to create an interconnect with copper as the base weld material to allow even higher stator coil temperatures. Alternative methods of joining the matched holes may be used, such as crimping, spot welding or laser welding. If welding is used, the stator coil operational temperature may rise to about 600 degrees F., which is the utilization temperature of the encapsulation material to be applied later. The matched solder holes (See FIGS. 1A and 1B) e.g., 34, 36, and 40, 38, respectively, are not required if solder is not the selected bonding material.

Figure 5:
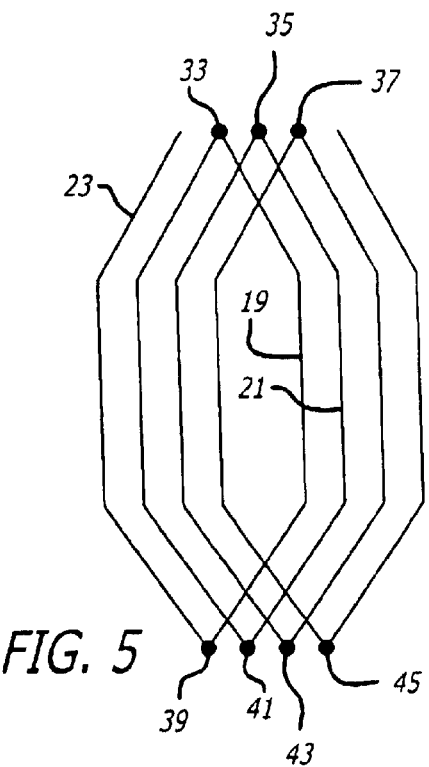
FIG. 5 is a graphic illustration of the interconnection of conductive loops to form a continuous cylindrical conductive coil for use in an exemplary brushless motor.

The soldered joints electrically interconnect all outer cylinder 44 conductive bands with respective inner cylinder 42 conductive bands so as to form a continuous, inductive helical structure as shown in FIG. 5. FIG. 5 shows an exemplary induction coil on a brushless motor stator coil, illustrating in detail how a portion of the helical structure of the coil winding can be accomplished with one end A of the winding being on the inner cylinder and the opposing end A' of the winding being on the outer cylinder. For example, inner cylinder 42 conductive band 23 is electrically connected at one end (hole 33) with outer cylinder 44 conductive band 19 and at the other end (hole 41) with outer cylinder conductive band 21. The rest of the inner cylinder 42 conductive bands are similarly interconnected with respective outer cylinder 44 conductive bands with the total number of interconnections at each end being the same. Essentially, the inner cylinder 42 conductive bands provide one half of the electric circuit and the outer cylinder 44 conductive bands provide the other half of the circuit. Joining the two halves completes the electric circuit. In comparison with a wire wound stator coil, the wire has a minimum bend radius at the cylinder ends that increase the stator coil wall thickness.

In at least one embodiment of the brushless motor, the stator coil is constructed with three separate windings to support three phase AC operation. Alternatively, the stator coil can be configured to support any AC brushless motor without departing from the inventive concepts described throughout. In three phase AC motor applications, the interconnects at the start and finish of each of the three windings are left unsoldered or unwelded for later connection as required by the particular circuit design.

The assembled stator coil 47 can be impregnated with encapsulating compound to provide additional structural stability, to permanently secure all components, and to provide complete electrical insulation of the stator coil. Specifically, the stator coil 47 can be impregnated with encapsulating polyimide, for example, a polyimide comprised of 25% solid/solute (polyimide) and 75% solvent (NMP). Polyimides are known for their high thermal resistance and are also generally considered to be non-flammable due to their aromatic, halogen-free structure that manifests itself in a very high limited oxygen index (about 38%). When subjected to flame, polyimide has a very low level of smoke formation and toxic gas formation, which makes it a good bonding agent for the stator coil 47. Polyimide is also chemically resistant to organic solvents such as alcohol, ketones, chlorinated hydrocarbons, and has low moisture absorption. The stator coil 47 can then be centrifuged, injected, dipped, impregnated or otherwise encapsulated to replace air voids with the polyimide solution. Centrifugal force pushes the air out of the structure and pushes the polyimide deeper into the crevices and cracks of the telescoped tubular structure allowing permanent bonding and insulation of the components.

The polyimide impregnated stator coil 47 can be heat-cured for example at a temperature of about 500 degree F. to remove solvents and to yield a hardened, cured polyimide encapsulated stator coil. A limitation to the curing temperature is the solder flow temperature generally about 550 degree F.; however, using non-solder welding techniques may allow polyimide curing at 695 degrees F. and stator coil operating temperatures of 600 degrees F. Other potting materials may be used such as ceramic, glass, silicates, silicones, etc. After the stator coil has been heat-cured, it is allowed to cool to room temperature. The end product is a strong, stiff and fully insulated stator coil that can be used in any motor application either as a stator coil in a brushless motor or an armature of an electromotive having brushes. An exemplary stator coil well suited for brushless motor applications is described in U.S. Pat. No. 6,111,329 entitled "Armature for an Electromotive Device," assigned to the assignee of the present invention and incorporated herein by reference.

It is worth noting that the cured stator coil 47 commonly has very low moisture absorption due to the composition of its components, which are commonly copper, high-quality soldering material, glass fiber and polylmide. This adapts the stator coil 47 for use in brushless motors used in medical/dental applications inasmuch as repeated heat sterilization or autoclave runs will not affect the operation of the stator coil.

Figure 6:
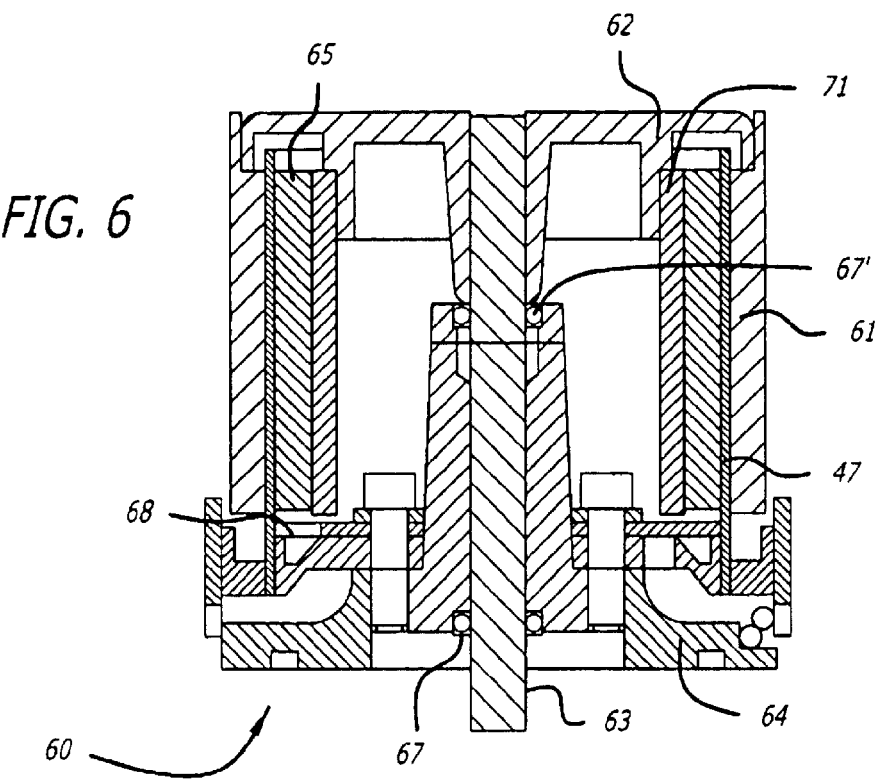
FIG. 6 is a graphic illustration of a lateral cross-sectional view of an exemplary brushless motor.
Figure 7:
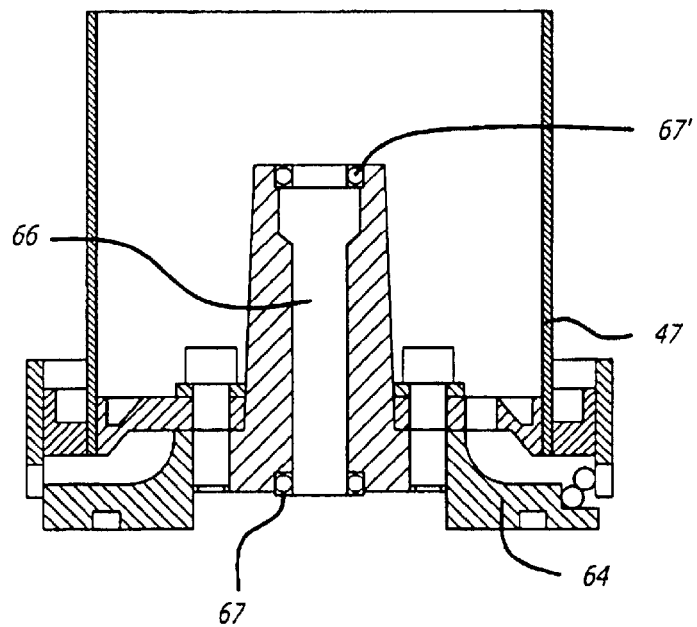
FIG. 7 is a graphic illustration of a longitudinal cross-sectional view illustrating the construction of a stator for an exemplary brushless motor.
Figure 8:
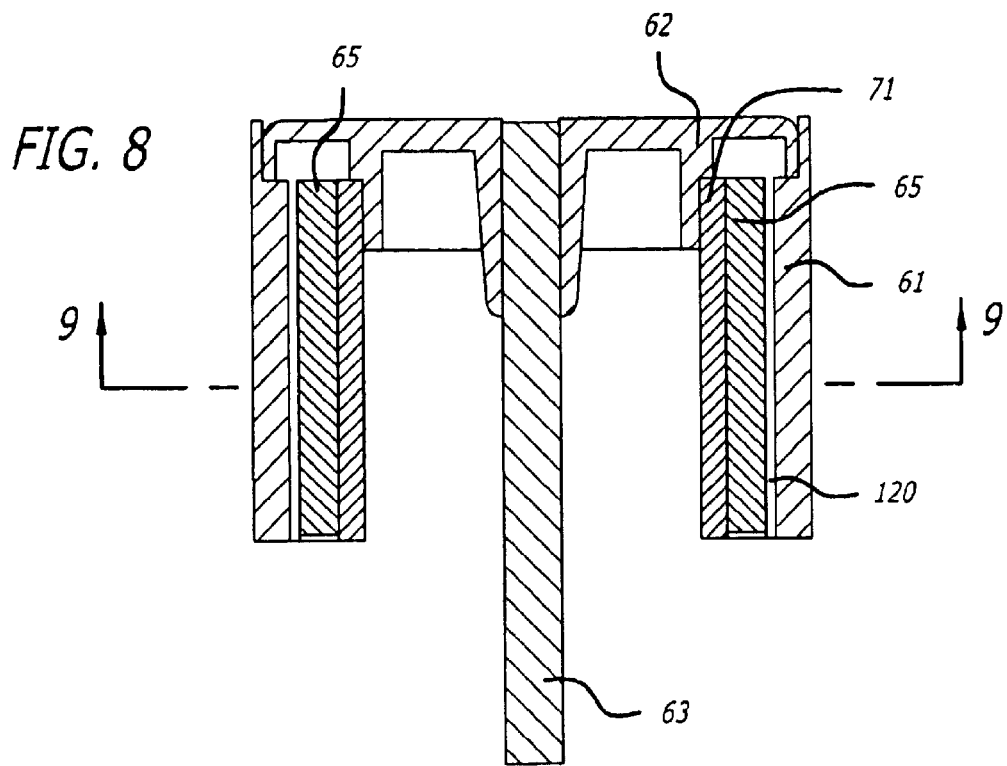
FIG. 8 is a a graphic illustration of a longitudinal cross-sectional view of a rotor adapted for use with the stator of FIG. 7 in an exemplary brushless motor.

An exemplary brushless motor with a free-standing stator coil is shown in longitudinal cross-sectional view in FIG. 6. The stator is shown separately in longitudinal cross-section in FIG. 7. The rotor is shown separately in longitudinal cross-section in FIG. 8 and transverse cross-section in FIG. 9. The brushless motor 60 includes a rotor having an outer cylinder 61 fitted with a rotor faceplate 62 at one end. The outer cylinder 61 can be an iron cylinder which provides a magnetic return path during motor operation. The rotor faceplate 62 can be configured to support a rotor shaft 63 extending through the outer cylinder 61 along its central axis. Positioned between the outer cylinder 61 and the rotor shaft 63 is an inner cylinder 71 concentrically aligned with the outer cylinder 61. The inner cylinder 71 provides a mounting surface for a magnet 65. This arrangement results in a magnetic air gap 120 between the outer cylinder 61 and the magnetic 65.

Figure 9:
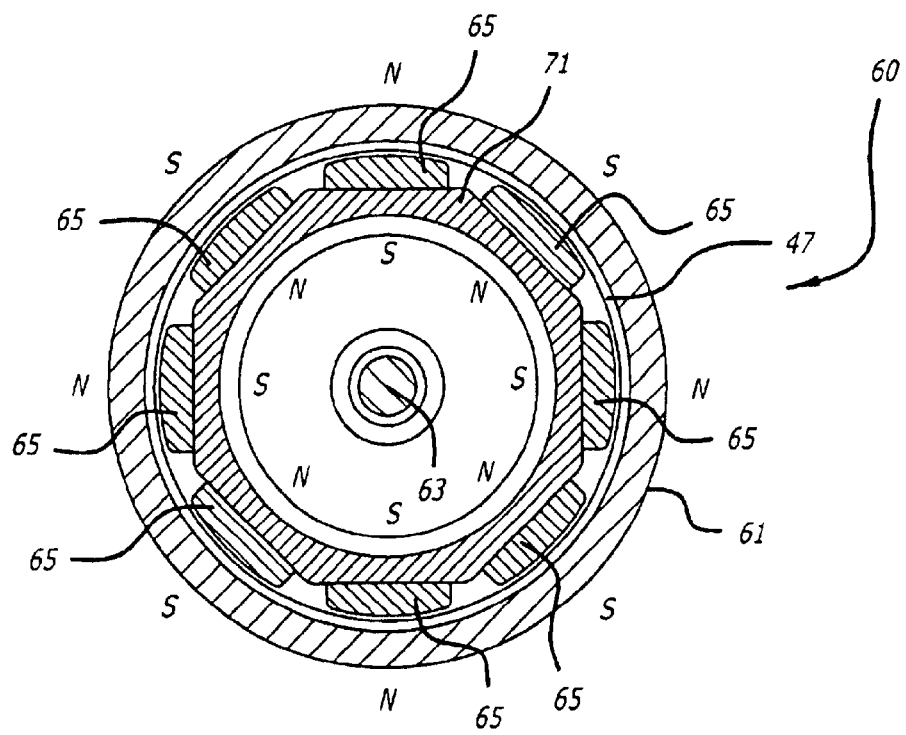
FIG. 9 is a graphic illustration of a transverse cross-sectional view of the rotor of FIG. 8 taken along section line 9—9 illustrating the position of the stator coils within the cylindrical gap in the rotor when the stator and rotor are juxtaposed.

The magnet 65 can be implemented in a variety of ways. An exemplary magnet 65 is shown in transverse cross-section in FIG. 9 with a stator coil 47 (heavy dotted line) disposed within the magnetic air gap 120 between the outer cylinder 61 and the magnet 65. The magnet 65 is shown as eight separate magnets equally spaced apart along the circumference of the mounting surface of the inner cylinder 71 of the rotor. As those skilled in the art will appreciate, the number of magnets and their respective arrangement on the mounting surface of the inner cylinder will vary depending on the number of poles and the overall design constraints. The stator coil 47, indicated in heavy dotted line, is spaced from the rotor and does not make contact with either the magnet 65 or the outer cylinder 61 of the rotor. The rotor is, therefore, able to rotate freely when the stator coil 47 is disposed within the magnetic air gap 120 between the magnet 65 and the outer cylinder 61 of the rotor. The individual magnets may be bonded to the mounting surface of the inner cylinder 71 as shown in FIG. 9, or alternatively, to the interior surface of the outer cylinder 61.

The stator includes a stator faceplate 64 for supporting the stator coil 47. Extending from the stator faceplate through the center of the stator coil 47 is a hollow shaft 66. The hollow shaft 66 can be equipped with front and rear ball bearings 67 and 67', respectively, for rotatably supporting the rotor shaft 63. The rotor shaft 63 projects forward of the stator faceplate 64 and is available for performing mechanical work.

In an exemplary embodiment of a three phase AC brushless motor, three sensors 68, such as Hall effect transistors, can be rigidly affixed to the stator coil 47 and the stator faceplate 64 radially separated from one another by 120 electrical degrees. Only one of the three sensors is shown in FIG. 6. The sensors sense the position of the magnets and sends a signal to a controller (not shown in FIG. 6) that is used for timing the switching and routing of electrical current to the respective windings of the stator coil 47. The timing of the change in current flow in the respective windings in the stator coil, triggered in response to the position of the magnets, is such as to produce a tangential force causing the rotor shaft 63 to rotate. These techniques are well known in the art.

The brushless motor can be used in a variety of applications such as drills (dental, medical, commercial), hobby craft, automotive, aerospace, photocopiers, printers, robotics, disc drives, pumps, compressors and motion control devices. In addition, the rotor (and the magnet affixed thereto) can be disposed to either underlie or overlie the stator. In an outer rotor embodiment (i.e., with the rotor overlying the stator) may be used, for example, for a belt drive. The electromotive device may be used for electrical generation and eddy current dampers in the same configuration.

While particular embodiments of the present invention have been illustrated and described, it would be apparent to those skilled in the art that various other changes and modifications can be made without departing from the spirit and scope of the invention. For example, the brushless motor in alternative embodiments may be configured to provide electrical generation when the shaft is rotated by mechanical means. Further, the iron ring may not be required for some applications and the stator can be formed into a cartridge which can be inserted into the inner diameter of a fixed laminate stack. It is therefore intended to cover in the appended claims all such changes and modifications that are within the scope of this invention.

What is claimed is:

1. A brushless motor, comprising:

a rotor having a mounting surface, a magnet disposed on the mounting surface, and a magnetic return without a magnet, the mounting surface and the magnetic return being concentric and arranged to form a gap between the magnet and the magnetic return; and a stator having an ironless coil disposed in the gap, the coil comprising concentric inner and outer winding portions separated by at least one continuous fiber strand wrapped a plurality of times around the inner winding portion, each of the winding portions comprising a plurality of conductive bands with each of the conductive bands of one of the winding portions being coupled to one of the conductive bands of the other winding portion, the winding portions being impregnated with an encapsulation material.

2. The brushless motor of claim 1 wherein the rotor further comprises a shaft rotatably supported by the stator.

3. The brushless motor of claim 1 wherein the rotor further comprises a rotor faceplate supporting the mounting surface and the magnetic return.

4. The brushless motor of claim 3 wherein the rotor further comprises a shaft coupled to the rotor faceplate.

5. The brushless motor of claim 1 wherein the magnet comprises a plurality of magnets.

6. The brushless motor of claim 1 wherein the stator further comprises a stator faceplate supporting the stator coil.

7. The brushless motor of claim 6 wherein the rotor further comprises a shaft rotatably supported by the stator faceplate.

8. A brushless motor, comprising:

a rotor having a mounting surface, a magnet disposed on the mounting surface, and a magnetic return surrounding the magnet to form a gap therebetween, the magnetic return being configured without a magnet, and wherein the mounting surface and the magnetic return are concentric; and a stator having an ironless coil disposed in the gap, the coil comprising concentric inner and outer winding portions separated by at least one continuous fiber strand wrapped a plurality of times around the inner winding portion, each of the winding portions comprising a plurality of conductive bands with each of the conductive bands of one of the winding portions being coupled to one of the conductive bands of the other winding portion, the winding portions being impregnated with an encapsulation material.

9. The brushless motor of claim 8 wherein the mounting surface and the magnetic return are cylindrical.

10. The brushless motor of claim 9 wherein the stator coil is cylindrical and is disposed in the gap concentrically with the mounting surface and the magnetic return of the rotor.

11. The brushless motor of claim 8 wherein the magnet comprises a plurality of magnets each extending along the mounting surface in an axial direction and being spaced apart an equal distance from one another.

12. The brushless motor of claim 8 wherein the stator further comprises a stator faceplate supporting the stator coil, the rotor being rotatably supported by the stator faceplate.

13. The brushless motor of claim 12 wherein the rotor further comprises a shaft supported by the rotor faceplate, the shaft being rotatably mounted to the stator faceplate.

14. The brushless motor of claim 8 wherein the rotor further comprises a rotor faceplate with the mounting surface and the magnetic return concentrically extending therefrom in an axial direction, and a shaft extending axially along a central axis common to the mounting surface and the magnetic return, and wherein the stator further comprises a stator faceplate supporting the stator coil, the rotor shaft being rotatably supported by the stator faceplate.

15. The brushless motor of claim 14 wherein the mounting surface, the magnetic return, and the stator coil are cylindrical.

* * * * *